Figure 1:
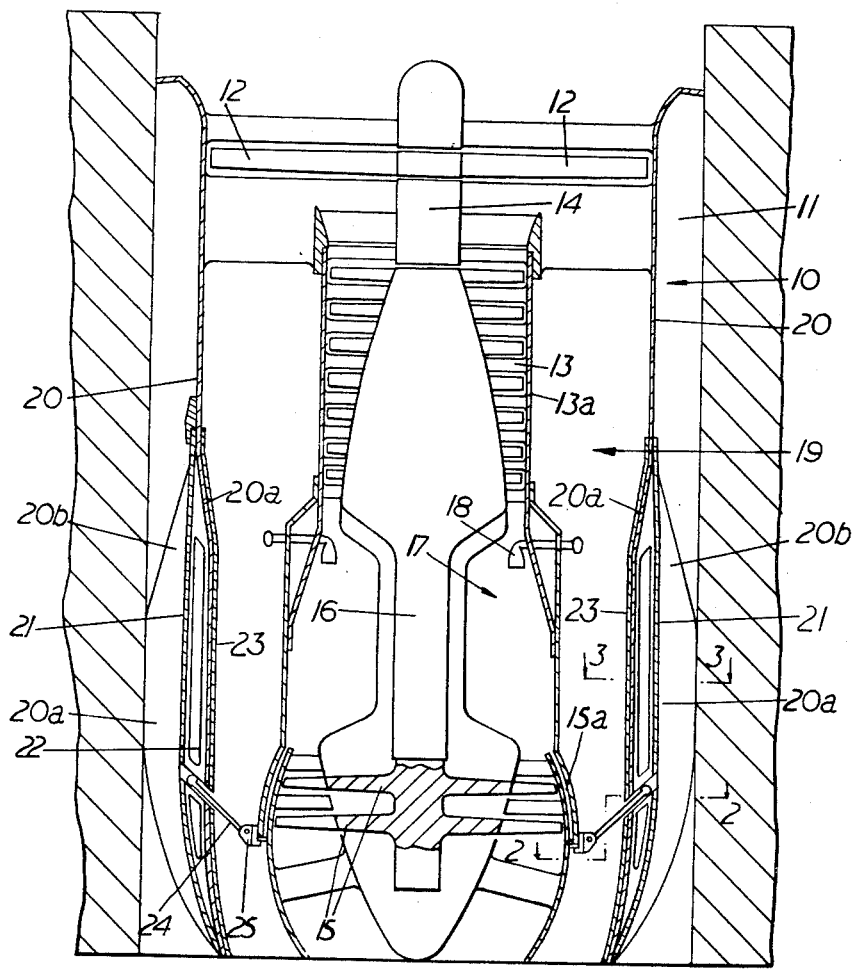

July 21, 1964  J. A. PETRIE ETAL  3,141,299
GAS TURBINE ENGINES

Filed Jan. 24, 1962  2 Sheets-Sheet 1

Inventors
James Alexander Petrie
Thomas Steel
By
Cushman, Darby & Cushman
Attorneys July 21, 1964 J. A. PETRIE ETAL 3,141,299
GAS TURBINE ENGINES Filed Jan. 24, 1962 2 Sheets-Sheet 2

Inventors
James Alexander Petrie
Thomas Steel
By
Cushman, Darby & Cushman
Attorneys

United States Patent Office 3,141,299
Patented July 21, 1964

3,141,299
GAS TURBINE ENGINES
James Alexander Petrie and Thomas Steel, Littleover, Derby, England, assignors to Rolls-Royce Limited, Derby, England
Filed Jan. 24, 1962, Ser. No. 168,439
Claims priority, application Great Britain Feb. 10, 1961
2 Claims. (Cl. 60—35.6)

This invention relates to gas turbine engines and in particular to the type of engine in which a proportion of the air compressed in a fan or low pressure compressor is by-passed through a duct formed around combustion equipment and turbines and possibly further air compressing means, the air emerging as a propulsive low velocity air stream which may mix with the hot propulsive gases from the turbines before or after a final propulsion nozzle. Engines of this type are usually known as by-pass gas turbine engines.

In such engines the outer wall of the by-pass duct usually has to be increased in diameter in the region of the combustion equipment and turbines in order that the cross-sectional area of the duct is not restricted in these regions. This leads to the by-pass duct outer wall being the largest diameter of the engine and therefore the size of engine bay into which the engine is installed has to have dimensions which are dictated by the diameter of the by-pass duct outer wall. As the remainder of the engine is of less diameter it means that if the engine bay dimensions are chosen to suit the maximum diameter of the by-pass duct outer wall then there is a large amount of waste space around the regions of smaller diameter. As the size of the engine bay limits the number of engines that can be installed in an aircraft it is desirable to keep them as small as possible. Also unduly large engine bays increase the weight of the aircraft.

One object of the present invention is to provide a by-pass duct outer wall which reduces the amount of waste space formed between the engine and the walls of the engine bay.

According to the present invention a by-pass gas turbine engine has the outer wall of the by-pass duct merging from circular cross-section to a cross-section formed by three or more intersecting arcuate portions of equal peripheral and radial extent, the arcuate portions each being concave relative to the longitudinal axis of the engine.

Preferably there are four intersections so arranged that if the engine is located with its longitudinal axis horizontal, one pair of intersections lie in a vertical plane intersecting the longitudinal axis of the engine and the other pair of intersections lie in a horizontal plane intersecting the longitudinal axis of the engine.

In a preferred arrangement the by-pass duct outer wall is installed in an engine bay of square cross-section, each arcuate portion being arranged to touch two sides of the square.

The cross-section of the by-pass duct outer wall may merge into circular section at its downstream end, and the rear end of the outer wall may be supported from the inner wall of the by-pass duct by a number of links or stays which extend radially across the duct.

Preferably each arcuate portion is strengthened by means of an external strap member or membrane which is secured to adjacent arcuate portions and extends over the point of intersection of the adjacent arcuate portions.

A rib member extending parallel to the longitudinal axis of the engine and having a length equivalent to the length of the arcuate portions is preferably located between each external strap member and each intersecting point of adjacent arcuate portions, said links or stays being secured to the rib members at their radially outer end.

The by-pass duct outer wall is preferably formed from strands of fibre-glass material (synthetic resin) impregnated with Phenolic or Epoxy resins.

The by-pass duct outer wall preferably forms part of an engine having a front fan which delivers air to the by-pass duct, said engine being mounted with its longitudinal axis vertical so that the propulsive gases exhaust to atmosphere vertically downwards.

Figure 2:
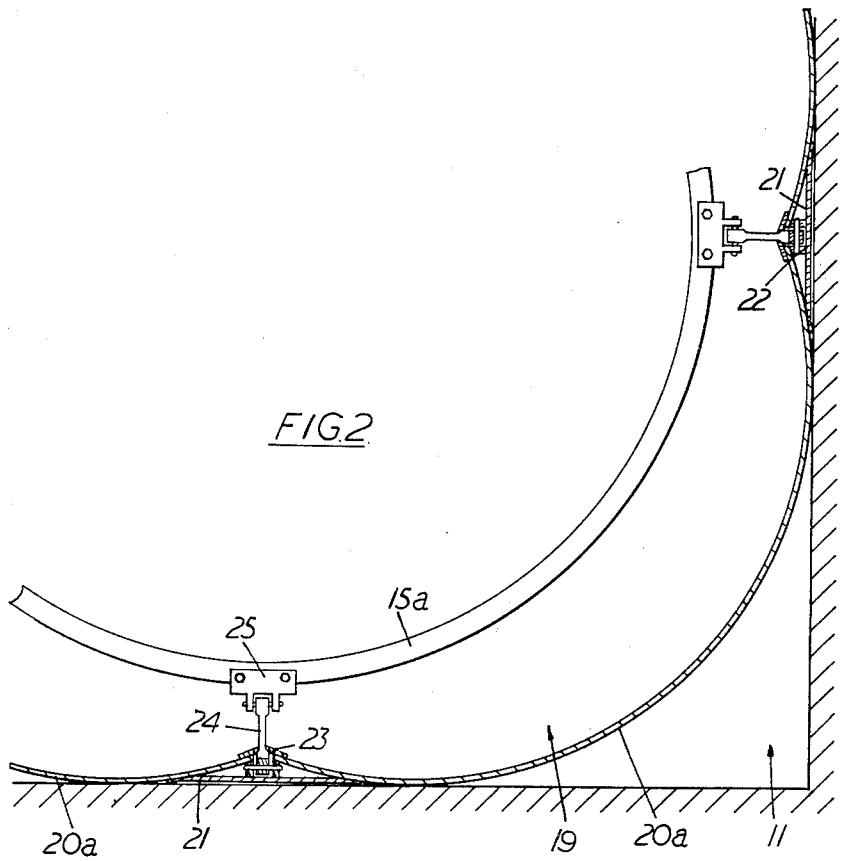
Figure 3:
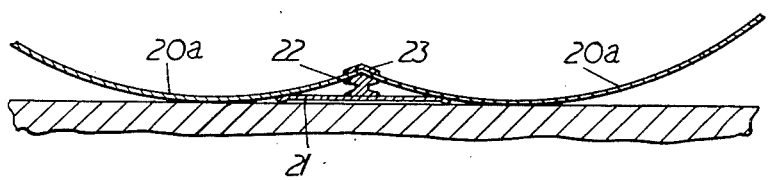

One embodiment of the present invention will now be described with reference to the drawings accompanying the provisional specification in which:

FIGURE 1 is a longitudinal section through a vertically mounted by-pass engine having a by-pass duct incorporating the present invention, FIGURE 2 is a part section taken on the line 2—2 indicated on FIGURE 1 and to a larger scale, and FIGURE 3 is a part section taken on the line 3—3 indicated on FIGURE 1 and to a larger scale.

The engine 10 is mounted with its longitudinal axis vertical in an engine bay 11. The engine 10 comprises a row of fan rotor blades 12 which are driven from an axial flow compressor 13 through gearing contained in a gear box 14. The compressor 13 is driven from a two stage turbine 15 by a shaft 16 and it delivers compressed air to combustion equipment 17 where fuel from fuel injectors 18 is burned in the compressed air.

A proportion of the air compressed by the fan rotor blades 12 is delivered to the intake of the axial flow compressor 13 and the remainder of the compressed air is delivered to the inlet of a by-pass duct 19 which has its inner wall formed by the outer casing 13a of the compressor 13, the combustion equipment 17 and the outer casing 15a of the turbine 15.

The by-pass duct 19 is provided with an outer wall 20 which is formed from strands of fibre-glass material impregnated with Phenolic or Epoxy resins. The outer wall 20 is circular in cross-section in the region surrounding the compressor 13 and it merges from this shape to a cross-section formed by four intersecting arcuate portions 20a of equal peripheral and radial extent (seen more clearly in FIGURE 2). The transition from circular to multi-bulbular takes place over the region 20b which is shown more clearly in FIGURE 1.

The engine bay 11 is of square cross-section and each arcuate portion 20a almost contacts two sides of the bay 11. By shaping the outer wall in this manner ensures that the best possible use is made of the space within the engine bay 11.

A strap 21 extends between, and is secured to, each arcuate portion 20a and extends from the upstream end of the transition section 20b to the downstream end of the outer wall 20. The downstream end of the outer wall 20 is of circular cross-section.

A rib member 22 substantially of I-shaped cross-section is located beween each intersection of adjacent arcuate portions 20a and each strap 21. Straps 23 are secured to each arcuate portion 20a on the opposite side of the arcuate portions to the rib members 22.

The rear portion of the by-pass duct outer wall 20 is supported from the outer casing 15a of the turbine 15 by a number of radially extending links 24. Each link 24 is pivotally mounted at its radially inner end to a bracket 25 secured to the casing 15a and is pivotally mounted to one of the rib members 22 at its radially outer end. The links 24 are inclined to the longitudinal axis of the engine 10 to allow relative axial and radial expansion and contraction to take place between the outer wall 20 of the by-pass duct 19 and the inner wall of the by-pass duct.

It will be appreciated that if the outer wall 20 was made circular in the region of the combustion equipment 17 and turbine 15 its diameter, in order to maintain the same cross-sectional area of the by-pass duct 19, would be such that the size of the engine bay 11 would have to be considerably increased in order to accommodate it. The result would be that there would be a great amount of waste space between the walls of the engine bay 11 and the upstream portion of the by-pass duct outer wall 20.

The links 24 and the straps 21 resist the tendency of the outer wall 20 to assume a completely circular shape when under pressure.

What we claim is:

1. In power plant for aircraft, the improvement comprising: an engine bay having a square cross-section; a by-pass gas turbine engine carried in said engine bay, said by-pass gas turbine engine having a casing, compressor means, combustion means, and turbine means arranged in flow series in said casing, and a by-pass duct surrounding said casing and extending longitudinally of at least a portion of said engine, said by-pass duct having an inner wall defined by the outer wall of said casing and an outer wall spaced outwardly of the inner wall; said outer wall merging from a circular cross-section in a region in which the by-pass duct is adjacent to said compressor means to a cross-section formed of at least four intersecting arcuate portions of equal peripheral and radial extent in a region in which the by-pass duct is adjacent said combustion means and said turbine means, each of said arcuate sections being concave relative to the longitudinal axis of the engine and being arranged to touch two walls of the engine bay; external strap members extending between and secured to adjacent arcuate portions of said outer wall, each of said strap members extending in spaced relationship over the intersection of adjacent arcuate portions; rib members extending parallel to the longitudinal axis of the engine and each having a length equal to the length of the arcuate portions, each of said rib members being located between and abutting one of said external straps and the respective intersecting point of adjacent arcuate portions, a second strap member secured to adjacent arcuate portions at the intersecting point of the same on an opposite side from said rib members; a plurality of links pivotally secured to said rib members at one end thereof, said links extending across said by-pass duct in a radial plane of the same and at an inclined angle to the longitudinal axis of the same, said links being pivotally connected at their other end to the inner wall of said by-pass duct.

2. A power plant as claimed in claim 1 in which the by-pass duct outer wall merges into a circular section at the downstream end of the engine.

References Cited in the file of this patent

UNITED STATES PATENTS

| | | |
|---|---|---|
| 695,309 | Hegan | Mar. 11, 1902 |
| 2,978,865 | Pierce | Apr. 11, 1961 |
| 3,004,388 | Foulon | Oct. 17, 1961 |
| 3,055,615 | Kerry | Sept. 25, 1962 |
| 3,081,705 | Warnken | Mar. 19, 1963 |

FOREIGN PATENTS

| | | |
|---|---|---|
| 788,290 | Great Britain | Dec. 23, 1957 |